(12) United States Patent
Kim et al.

(10) Patent No.: US 11,303,977 B2
(45) Date of Patent: Apr. 12, 2022

(54) SERVER FOR MANAGING HOME NETWORK AND CONTROL METHOD THEREFOR

(71) Applicant: Samsung Electronics Co., Ltd., Suwon-si (KR)

(72) Inventors: Jae-deok Kim, Ansan-si (KR); Sae-bom Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 16/464,989

(22) PCT Filed: Dec. 19, 2017

(86) PCT No.: PCT/KR2017/015044
§ 371 (c)(1),
(2) Date: May 29, 2019

(87) PCT Pub. No.: WO2018/117610
PCT Pub. Date: Jun. 28, 2018

(65) Prior Publication Data
US 2019/0297401 A1 Sep. 26, 2019

(30) Foreign Application Priority Data

Dec. 20, 2016 (KR) .......................... 10-2016-0174785
Nov. 3, 2017 (KR) .......................... 10-2017-0145918

(51) Int. Cl.
*H04Q 9/00* (2006.01)
*G06N 20/00* (2019.01)

(52) U.S. Cl.
CPC ............... *H04Q 9/00* (2013.01); *G06N 20/00* (2019.01); *H04Q 2209/86* (2013.01)

(58) Field of Classification Search
CPC ....... H04Q 9/00; H04Q 2209/86; G06N 20/00
See application file for complete search history.

(56) References Cited

U.S. PATENT DOCUMENTS 5,510,975 A * 4/1996 Ziegler, Jr. ........... G05B 13/028
700/49
8,255,351 B2 8/2012 Lee et al.
(Continued)

FOREIGN PATENT DOCUMENTS

KR 10-0863126 B1 10/2008
KR 10-0991136 B1 11/2010
(Continued)

OTHER PUBLICATIONS

J. Chen et al., "Distributed fault detection of wireless sensor networks," Proc. Worshop DIWANS, 2006.
(Continued)

*Primary Examiner* — Amine Benlagsir
(74) *Attorney, Agent, or Firm* — Jefferson IP Law, LLP

(57) ABSTRACT

A server for managing a home network is provided. The server according to an embodiment includes a storage configured to store an operation state of at least one electronic apparatus in the home network and reference sensing data for each of a plurality of sensors, a communicator configured to receive sensing data from the plurality of sensors, and a processor configured to determine the operation state of the at least one electronic apparatus, and compare the stored reference sensing data corresponding to the determined operation state with the received sensing data to determine whether an error occurs in the plurality of sensors and the at least one electronic apparatus.

14 Claims, 13 Drawing Sheets

(56) References Cited

U.S. PATENT DOCUMENTS

| | | | |
|---|---|---|---|
| 10,579,971 B1* | 3/2020 | Davis | G06Q 10/1097 |
| 2009/0113232 A1 | 4/2009 | Park et al. | |
| 2010/0057649 A1* | 3/2010 | Lee | H04L 41/147 |
| | | | 706/12 |
| 2015/0185713 A1 | 7/2015 | Glickfield et al. | |
| 2015/0234694 A1 | 8/2015 | Chow et al. | |
| 2015/0347114 A1 | 12/2015 | Yoon | |
| 2016/0006576 A1* | 1/2016 | Matsuzaki | G06F 13/00 |
| | | | 709/224 |
| 2016/0140009 A1 | 5/2016 | Watanabe et al. | |
| 2016/0148444 A1 | 5/2016 | Sauerteig et al. | |
| 2016/0163133 A1 | 6/2016 | Ricci | |
| 2017/0205791 A1 | 7/2017 | Yang et al. | |

FOREIGN PATENT DOCUMENTS

| | | |
|---|---|---|
| KR | 10-2011-0126436 A | 11/2011 |
| KR | 10-1208857 B1 | 12/2012 |
| KR | 10-2014-0028369 A | 3/2014 |
| KR | 10-2014-0118925 A | 10/2014 |
| KR | 10-2016-0010785 A | 1/2016 |
| KR | 10-1591754 B1 | 2/2016 |

OTHER PUBLICATIONS

Li et al., Low-Complexity Distributed Fault Detection for Wireless Sensor Networks, IEEE ICC 2015.

* cited by examiner

|  | FIRST SENSOR | SECOND SENSOR | THIRD SENSOR | . . . |
|---|---|---|---|---|
| OPERATION STATE A | XX | XXX | XXXX |  |
| OPERATION STATE B | X | - | XX |  |
| ⋮ |  |  |  |  |

SERVER FOR MANAGING HOME NETWORK AND CONTROL METHOD THEREFOR

TECHNICAL FIELD

Devices and methods consistent with what is disclosed herein relate to a server for managing a home network and a controlling method thereof, and more particularly, to a server for automatically sensing errors of a device in a home network and a controlling method thereof.

The disclosure also relates to a server for automatically sensing errors of a device using an Artificial Intelligence (AI) system simulating functions such as recognition, determination, etc. of a human brain by using a machine training algorithm and a controlling method thereof.

BACKGROUND ART

With the development of a computer technology, a communication technology, and a home electronics technology, a home network management service for managing home appliances and a system through a home network has emerged, and it is on the rise as a future-oriented technology.

All information home appliances connected via s home network transmits data from one another, and perform communication with various user terminal devices. For example, a user may control all home appliances connected via a home network using a user interface (UI) provided in a user terminal device such as a mobile phone, etc. regardless of time and place.

However, there is a difficulty in maintaining, managing and repairing multiple devices in such an environment. For example, although a specific sensor in the home network is broken, such breakdown of the device is not checked by naked eye. Therefore, it has been difficult for a user to recognize breakdown.

In addition, a home network environment is not structured in a definite form, but an environment constituted by devices could vary depending on user needs. Therefore, it has been impossible to assume a specific environment and predict a device breakdown situation which is subject to the environment.

Recently, artificial intelligence systems that implement artificial intelligence (AI) have been used in various fields. An artificial intelligence system is a system in which the machine learns, judges and becomes smart, unlike a conventional rules-based smart system. The more the artificial intelligence system is used, the higher the recognition rate and the better the understanding of a user's preferences.

Artificial intelligence technology consists of machine learning (e.g., deep-learning) and element technologies that use machine learning.

Machine learning is an algorithm technology that classifies/trains the characteristics of input data by itself. Element technology is a technology that simulates functions, such as recognition and judgment of the human brain, using a machine learning algorithm such as deep learning and includes linguistic understanding, visual understanding, reasoning/prediction, knowledge representation, motion control, etc.

Artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if perceived by a human being, including object recognition, object tracking, image search, human recognition, scene understanding, spatial understanding, image enhancement, etc. Inference prediction is a technology for judging and logically inferring and predicting information, including knowledge/probability-based reasoning, optimization prediction, preference-bases planning, and recommendations. Knowledge representation is a technology for automating human experience information into knowledge data, including knowledge building (data generation/classification) and knowledge management (data utilization). Motion control is a technology for controlling the autonomous movements of a device or object, e.g., travel of a vehicle and the motion of a robot, including motion control (navigation, collision and traveling), operation control (behavior control), and the like.

CONTENT OF THE INVENTION

Technical Problem

An aspect of the exemplary embodiments relates to providing a server for automatically sensing errors of a device in a home network and a controlling method thereof.

Another aspect of the exemplary embodiments relates to providing a server for automatically sensing errors of a device in a home network using an artificial intelligence system and a controlling method thereof.

Technical Solution

According to an exemplary embodiment, there is provided a server for managing a home network, including: a storage configured to store an operation state of at least one electronic apparatus in the home network and reference sensing data for each of a plurality of sensors; a communicator configured to receive sensing data from the plurality of sensors; and a processor configured to determine the operation state of the at least one electronic apparatus, and compare the stored reference sensing data corresponding to the determined operation state with the received sensing data to determine whether an error occurs in the plurality of sensors and the at least one electronic apparatus.

The processor may be further configured to determine whether each of the sensing data received from the plurality of sensors is within a predetermined allowable range of reference sensing data for each of a plurality of sensors corresponding to the determined operation state, and determine whether an error occurs in the plurality of sensors and the at least one electronic apparatus based on the determination.

The processor may be further configured to, based on a sensor beyond the predetermined allowable range among the plurality of sensors being a predetermined ratio or more, determine that an error occurs in the at least one electronic apparatus in relation to the determined operation state, and based on the sensor beyond the predetermined allowable range among the plurality of sensors being the predetermined ratio or less, determine that an error occurs in the sensor beyond the predetermined allowable range.

The processor may be further configured to, based on the operation state of the at least one electronic apparatus being a new operation state, store sensing data received from each of the plurality of sensors at a time point corresponding to the new operation state in the storage as reference sensing data corresponding to the new operation state.

The processor may be further configured to, based on the operation state of the at least one electronic apparatus being a new operation state, store sensing data indicating a change in sensing value at a time point corresponding to the new operation state among a plurality of sensing data respectively received from the plurality of sensors in the storage as reference sensing data corresponding to the new operation state.

The processor may be further configured to, based on the operation state of the at least one electronic apparatus being determined after a new sensor is registered in the home network, store sensing data received from the new sensor at a time point corresponding to the determined operation state in the storage as reference sensing data of the new sensor with respect to the determined operation state.

The processor may be further configured to receive state information from the at least one electronic apparatus, and determine the operation state of the at least one electronic apparatus based on the received state information.

The processor may be further configured to control the communicator to transmit information on a device determined to have an error among the at least one electronic apparatus and the plurality of sensors to a user terminal device.

The processor may be further configured to control the communicator to transmit information on the determined operation state to a user terminal device along with information on a device determined to have an error among the at least one electronic apparatus and the plurality of sensors.

According to an exemplary embodiment, there is provided a method of a server for managing a home network, the method including storing an operation state of at least one electronic apparatus in the home network and reference sensing data for each of a plurality of sensors, receiving sensing data from the plurality of sensors, determining the operation state of the at least one electronic apparatus, and comparing the stored reference sensing data corresponding to the determined operation state with the received sensing data, and determining whether an error occurs in the plurality of sensors and the at least one electronic apparatus.

The determining whether the error occurs may include determining whether each of the sensing data received from the plurality of sensors is within a predetermined allowable range of reference sensing data of each of a plurality of sensors corresponding to the determined operation state, and determining whether an error occurs the plurality of sensors and the at least one electronic apparatus based on the determination.

The determining whether the error occurs may include, based on a sensor beyond the predetermined allowable range among the plurality of sensors being a predetermined ratio or more, determining that an error occurs in the at least one electronic apparatus in relation to the determined operation state, and based on the sensor beyond the predetermined allowable range among the plurality of sensors being the predetermined ratio or less, determining that an error occurs in the sensor beyond the predetermined allowable range.

The storing may include based on the operation state of the at least one electronic apparatus being a new operation state, storing sensing data received from each of the plurality of sensors at a time pint corresponding to the new operation state as reference sensing data corresponding to the new operation state.

The storing may include, based on the operation state of the at least one electronic apparatus being a new operation state, storing sensing data indicating a change in sensing value at a time point corresponding to the new operation state among a plurality of sensing data respectively received from the plurality of sensors as reference sensing data corresponding to the new operation state.

The storing may include, based on the operation state of the at least one electronic apparatus being determined after a new sensor is registered in the home network, storing sensing data received from the new sensor at a time point corresponding to the determined operation state as reference sensing data of the new sensor with respect to the determined operation state.

The determining of the operation state may include receiving state information of the at least one electronic apparatus and determining the operation state of the at least one electronic apparatus based on the received state information.

A controlling method of a server may further include transmitting information on a device determined to have an error among the at least one electronic apparatus and the plurality of sensors to a user terminal device.

The method may further include transmitting information on the determined operation state to a user terminal device along with information on a device determined to have an error among the at least one electronic apparatus and the plurality of sensors.

A computer readable recording medium including a program for executing a controlling method of a server for managing a home network, the method including storing an operation state of at least one electronic apparatus in the home network and reference sensing data for each of a plurality of sensors, receiving sensing data from the plurality of sensors, determining the operation state of the at least one electronic apparatus, and comparing the stored reference sensing data corresponding to the determined operation state with the received sensing data to determine whether an error occurs in the plurality of sensors and the at least one electronic apparatus.

BRIEF DESCRIPTION OF THE DRAWINGS

FIG. 6 is a view to explain reference sensing data for error determination that is stored in a look-up table form according to an embodiment;

DETAILED DESCRIPTION OF EXEMPLARY EMBODIMENTS

Figure 1:
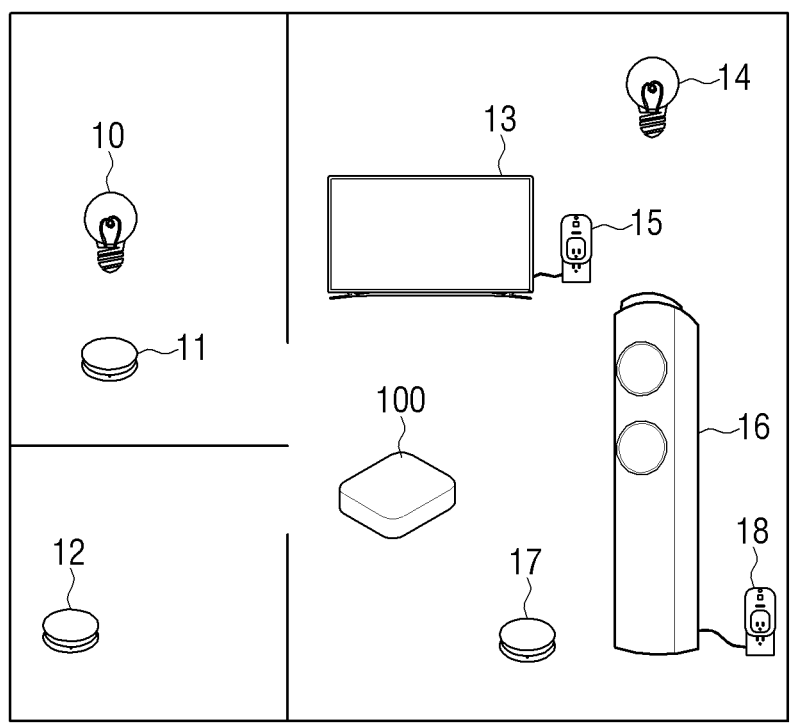
FIG. 1 is a view to explain a home network system according to an embodiment.

The present disclosure is not limited to an embodiment disclosed below and may be implemented in various forms and the scope of the present disclosure is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted. In addition, the attached drawings are not drawn to scale to facilitate understanding of the present disclosure, but the dimensions of some of the components may be exaggerated.

The terms such as "first," "second," and so on may be used to describe a variety of elements, but the elements should not be limited by these terms. The terms are used simply to distinguish one element from other elements.

The terms used in the application are merely used to describe particular exemplary embodiments, and are not intended to limit the invention. Singular forms in the invention are intended to include the plural forms as well, unless the context clearly indicates otherwise. The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the disclosure will be described in detail with reference to the accompanying drawings so that those skilled in the art can easily carry out the invention. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

Hereinafter, the disclosure will be described in more detail with reference to accompanying drawings.

FIG. 1 is a view to explain a home network system 1000 according to an embodiment.

Referring to FIG. 1, a home network system 1000 include a server 100 and a plurality of client devices 11 to 18 connected to the server 100.

The server may be connected to the plurality of client devices 11 to 18 in a home network in a wired or wireless communication method. The server 100 may control, manage, or interlock the plurality of client devices 11 to 18. The server 100 may be an independent device, or mounted on another device.

The server 100 may serves as a gate way relaying between a network at home and an external network. In this case, the server 100 may transmit a control command provided from an external device to the plurality of client devices 11 to 18, or collect state information of the plurality of client devices 11 to 18 to be provided to the external device.

The server 100 may receive a control command from a user terminal device to control the plurality of client devices 11 to 18, and collect the state information of the plurality of client devices 11 to 18 to transmit the state information to the user terminal device. In this case, the user terminal device may be a smartphone, a desk top computer, a laptop, a tablet PC, a PDA, etc.

Referring to FIG. 1, in order to maintain and manage a plurality of client devices, the server 100 may automatically determine the errors of the plurality of client devices 11 to 18. In this specification, the client device may be an electronic apparatus or a sensor included in a home network.

Referring to FIG. 1, the plurality of client devices 11 to 18 may include a sensor for sensing an environment, for example, such as a temperature/illumination sensor 11, 12 and 17, a power measurement sensor 15 and 18, and a device to be sensed by such sensor, for example, a bulb 10 and 14, a TV 13, an air conditioner, etc. The device such as the bulb 10 and 14, the TV 13, the air conditioner 16, etc. may have a sensing function.

For example, the bulb 10 and 14 may include an illumination sensor, and the brightness of the bulb 10 and 14 may be adjusted automatically based on the brightness of surroundings sensed by the sensor. In addition, the TV 13 may include an illumination sensor, and the brightness of the display of the TV 13 may be automatically adjusted based on the brightness of the surroundings sensed by the sensor. The air conditioner 16 may include a temperature sensor, and the cooling temperature may be automatically controlled based on the temperature sensed by the sensor.

The server 100 may detect a device in which an error occurs based on the operation relationship between the plurality of client devices 11 to 18.

For example, when a power of the TV 13 is turned on, the display of the TV may be turned on. Therefore, a first temperature/illumination sensor 10 near the TV may sense an illumination change, and the power measurement sensor 15 may measure power consumption as the power of the TV is applied. In such a state, an error may not occur. However, when an error occurs in the first temperature/illumination sensor 10, when the TV 13 is turned on, the power measurement sensor 15 may measure power consumption according to the supply of power to the TV, and the first temperature/illumination sensor 10 may not sense an illumination change. In other words, compared to a normal state, it can be seen that a problem occurs in the first temperature/illumination sensor 10.

The server 100 may store information on the operation relationship between the plurality of client devices 11 to 18 in a normal operation state, and detect which client device has an error in the determined operation states of the plurality of client devices 11 to 18 based such information.

According to an embodiment, the information on the operation relationship between the plurality of client devices 11 to 18 in a normal operation state may be obtained during a process of using the client devices in a home network. Therefore, the time and cost required for establishing such information separately may be reduced. Further, such information may be adaptively renewed even in an environment change such as adding a new device to a home network, and thus the disclosure is appropriate to be applied to an IoT environment.

The server 100 may transmit information on a device in which an error occurs and information on a state in which an error occurs to a user terminal device to notify a user of it.

Meanwhile, a home network system has been exemplified, but is not limed thereto. The environment could be various such as a school, a company, etc.

Also, the server 100 is described a single one, but the home network system 1000 may have several servers.

Hereinafter, the server 100 will be described in more detail in reference to FIG. 2.

Figure 2:
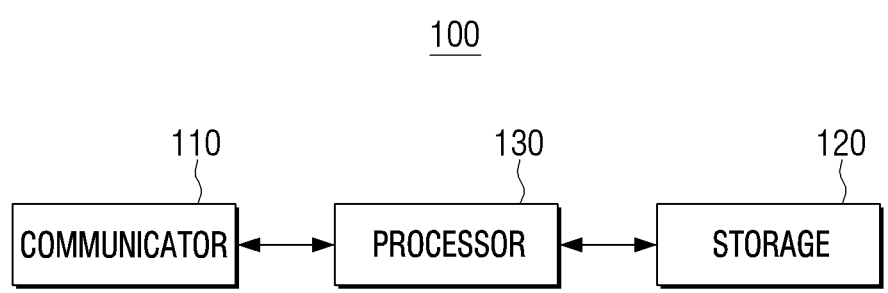
FIG. 2 is a block diagram to explain a configuration of a server for managing a home network according to an embodiment.

Referring to FIG. 2, a server 100 may include a communicator 110, a storage 120, and a processor 130.

The communicator 110 may be a transceiver that performs communication with various types of external apparatuses according to various types of communication methods. The communicator 110 may be connected to an external apparatus through a Local Area Network (LAN) or an Internet network, and may be connected to the external apparatus via wireless communication (e.g., Z-wave, 4LoWPAN, RFID, LTE D2D, BLE, GPRS, Weightless, Edge Zigbee, ANT+, NFC, IrDA, DECT, WLAN, Bluetooth, WiFi, Wi-Fi Direct, GSM, UMTS, LTE, WiBRO, etc.). The communicator 110 may include various communication chips such as a Wi-Fi chip, a Bluetooth chip, a wireless communication chip, and the like.

The communicator 110 may be connected to client devices included in a home network managed by the server 100 to receive state information. In addition, the communicator 110 may receive sensing data from sensors included in the home network.

The storage 120 may store various programs, and information necessary for controlling the server 100. For example, the storage 120 may be implemented as a non-volatile memory, a volatile memory, a flash memory, a hard disk drive (HDD), or a solid state drive (SSD). Meanwhile, the storage 120 may be implemented not only as a storage medium in the electronic apparatus 100, but also as an external storage medium, such as a micro SD card, a USB memory, and an external server.

The storage 120 may store various information necessary for managing the home network. For example, the storage 120 may include information on the client devices connected to the server 100. To be specific, when a client device is a sensor, information on an object to be sensed by the sensor may be stored in the storage 120.

The storage 120 may store list of control commands for controlling the client devices. The list of the control commands may be stored in the storage 120 for each client device.

The storage 120 may store information generated by using the client devices. To be specific, the storage 120 may list the history of controlling the client devices. The storage 120 may store the history of sensing data generated by a sensor among the client devices.

The storage 120 may store an operation state of at least one electronic apparatus in a home network and a plurality of sensor-specific reference sensing data. The reference sensing data may be stored in the storage 120 in a look-up table format for each of a plurality of sensors for each operation state.

According to an embodiment, the processor 130 may control the overall operation of the server 100. The processor 130 may include at least one CPU (or DSP, MPU, etc.), RAM, ROM, and a system bus. The processor 130 may be implemented as a MICRO COMPUTER (MICOM), an application specific integrated circuit (ASIC), or the like.

The processor 130 may determine the operation states of the client devices included in the home network. The operation state may relate to one or more of the client devices.

For example, the processor 130 may receive state information from the client devices, and determine the operation states of the client devices based on the received state information.

The state information may be information that enables the server 100 to identify the operation state of the client device. To be specific, the state information may be information that enables the server 100 to identify the operation state of the client device. For example, in a case of a TV, the state information may be information for notifying whether the power of the TV is turned on or off, or whether an operation mode is a power saving mode, etc. In a case of an air conditioner, the state information may be information for notifying whether the cooling of the air conditioner is operated, what degree the cooling temperature is, whether the dehumidifying function is performed in the air conditioner, etc.

For another example, the state information may be information indicating the sensing state of the sensor. In this case, the state information may be determined based on the sensing data received from the sensor. For example, a presence sensor may transmit sensing data to the server 100, and the processor 130 may determine whether the presence sensor senses the presence based on the received sensing data. For another example, a temperature sensor may transmit sensing data to the server 100, and the processor 130 may determine what degree the temperature sensor has sensed based on the received sensing data.

Depending on a client device, state information may be transmitted to the server 100 continuously or at a predetermined period of time. The processor 130 may request the communicator 110 to transmit state information to the client device, and upon the request, the client device may transmit the state information to the server 100. The processor 130 may control the communicator 110 to transmit a control command for performing a specific operation to the client device, and the client device may perform an operation corresponding to the received control command, and transit the state information as response information informing the operation has been performed.

As described above, the processor 130 may determine the operation states of the client devices in the home network based on the state information received at least one client device.

For another example, the operation state may be determined based on the sensing data instead of the state information. To be specific, the processor 130, when the operation state is determined, may store the reference sensing data corresponding to the operation state in the storage 120 based on the sensing data received from the sensors in the home network at a time point corresponding to the operation state. When sensing data is received from the sensors, the operation state may be determined by comparing the received sensing data with the stored reference sensing data.

The processor 130 may use the sensing data received from the sensor itself, or manufacture the received sensing data to use. For example, the processor 130 may store a temperature value received from a temperature sensor itself as reference sensing data, or store information on the rise and fall of the temperature determined based on the temperature value received from the temperature sensor as reference sensing data.

The processor 130 may store reference sensing data of each of the plurality of sensors in the home network in the storage 120 for various operation states of the client devices. The reference sensing data may be used for determining whether the client devices are defective. The reference sensing data may not be defined in advance, but generated as the client devices are used.

The processor 130 may determine the operation states of the client devices, and when the determined operation state is new, may store reference sensing data corresponding to the new operation state based on the sensing data received from the sensors in the home network at a time point corresponding to the new operation state in the storage 120.

For each operation state, reference sensing data of each of the plurality of sensors may be stored in the storage 120 in a look-up table format.

The processor 130 may determine the operation states of the client devices, when the determined operation state is registered in a look-up table, compare the reference sensing data of the plurality of sensors corresponding to the operation state with a plurality of sensing data received from each of the plurality of sensors, determine whether each of the plurality of received sensing data is within a predetermined allowable range of a plurality of sensor-specific reference sensing data, and determine whether error occur in the client devices related to the operation state based on the determination.

Determining whether the each of the plurality of sensing data is within a predetermined allowable range may mean determining whether inconsistency between the compared sensing data is within a predetermined error range.

An example embodiment related to the storing of the reference sensing data will be described with reference to FIG. 3.

Figure 13:
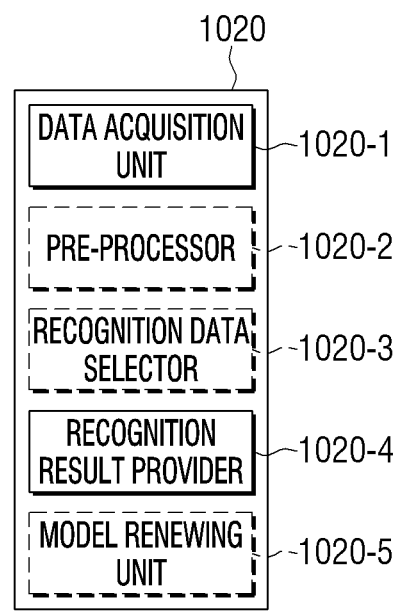

Referring to FIG. 13, a TV 31 may be turned on, and the TV 31 may transmit state information for notifying that a power is on to the server 100. The processor 130 may determine the operation state that the TV is turned on based on the state information received from the TV 31, and if the operation state is new one, that is, if the operation state is an initially determined operation state, the processor 130 may store sensing data received from each of the power measurement sensor 32 and the illumination sensor 33 at the time of turning on the TV in the storage 120 as reference sensing data corresponding to the operation state of 'TV power is on'. As the power of the TV 31 is turned on, the display of the TV may be turned on. Therefore, the brightness change may be sensed by the illumination sensor 33, and the power consumption may be sensed by the power measurement sensor 32. Each of the sensing data may be stored as reference sensing data corresponding to the operation state in which the power of the TV is turned on.

After the reference sensing data is stored, when the operation state in which the power of the TV 31 is turned on is determined based on the state information received from the TV 31, the processor 130 may compare sensing data received from each of the power measurement sensor 32 and the illumination sensor 33 with the stored reference sensing data. As a result of comparison, if the sensing data received from the illumination sensor 33 is within a predetermined allowable range of the reference sensing data of the illumination sensor 33, and the sensing data received from the power measurement sensor 32 is out of the predetermined allowable range of the reference sensing data of the power measurement sensor 32 (e.g., when a power change is not sensed), the processor 130 may determine that an error has occurred in the power measurement sensor 32.

However, as a result of comparison, if the sensing data received from the illumination sensor 33 and the sensing data received from the power measurement sensor 32 are all beyond a predetermined allowable range, it is likely that the an error occurs in the TV 31 rather than an error occurs in the power measurement sensor 32. For example, such situation may be that the TV 31 transmits state information notifying that the power is on to the server 100, but a display of a TV is not on due to the problem of components in the TV 31.

In this case, the illumination sensor 33 may not sense the brightness change because the display of the TV is not turned on, and the power measurement sensor 32 may not sense power consumption as much as in a normal display operation because the display of the TV 31 is not operated. Therefore, the processor 130 may determine that an error occurs in the TV 31 if the sensing data received from the power measurement sensor 32 and the illumination sensor 33 does not coincide with reference sensing data although the power-on operation state of the TV is determined.

Meanwhile, the sensing data used for determining an error may be non-manufactured data received from the sensor, or data manufactured by analyzing the data received from the sensor. For example, a temperature value received from the temperature sensor may be used for sensing data for determining whether an error has occurred, and information on the rise and fall of the temperature, which is obtained by analyzing and manufacturing the temperature value received from the temperature sensor, may be used as one of the sensing data.

As described above, the processor 130 may determine the operation states of the electronic devices in a home network, and compare reference sensing data of each of the plurality of sensors corresponding to the determined operation state with the plurality of sensing data received from the plurality of sensors by sensor, and determine the errors of the sensors and the electronic apparatuses.

It has been described that the reference sensing data is generated upon the determination of a new operation state, but is not limited thereto. The processor 130 may collect new reference sensing data with respect to the re-generate operation state, and compare the newly collected reference sensing data with the stored reference sensing data, and if they coincide with other within a predetermined allowable range, incorporate the newly collected reference sensing data into the pre-stored reference sensing data, and newly generate the average of the reference sensing data and the pre-stored reference sensing data as reference sensing data corresponding to the operation state.

The processor 130, when the operation state of at least one electronic apparatus in a home network is determined after a new sensor is registered to a home network, may store the sensing data received from a new sensor at a time point corresponding to the determined operation state in the storage 120 as reference sensing data of the new sensor with respect to the determined operation state. In other words, the reference sensing data of the new sensor with respect to the determined operation state may be added to a look-up table. Whenever an operation state related to a new sensor is newly generated, reference sensing data may be generated based on the sensing data of the new sensor, and added to the look-up table.

Figure 3:
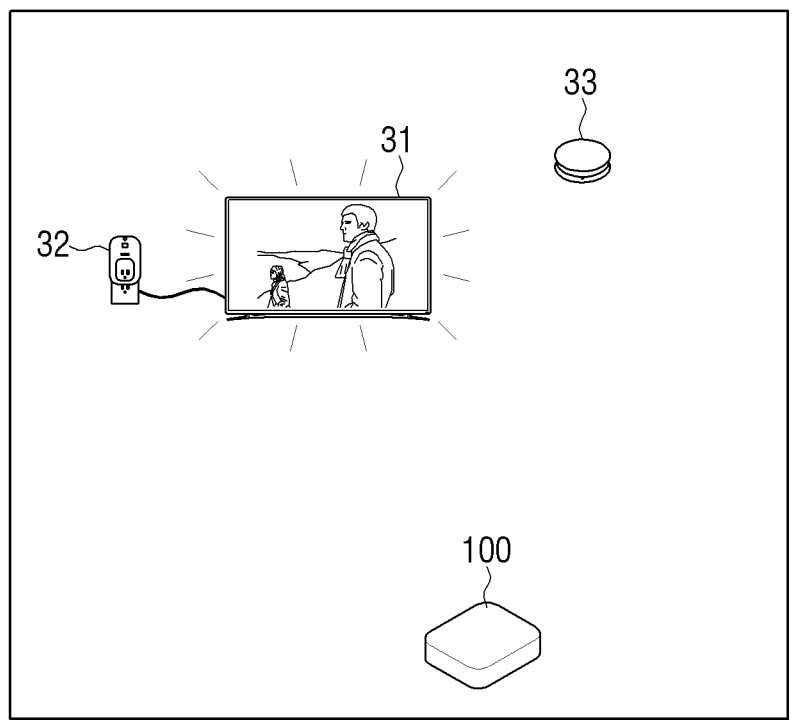
FIG. 3 to FIG. 5 are views to explain an error determination method of a server according to various embodiments.

For example, referring to FIG. 3, when a new second illumination sensor is newly arranged close to the TV 31 as well as the power measurement sensor 32 and the first illumination sensor 33, when the turn-on operation of the TV 31 is determined, the processor 130, if sensing data received from the second illumination sensor is initial when the operation state occurs, may generate reference sensing data of the second illumination sensor corresponding to the operation state where the power of the TV 31 is turned on and add the reference sensing data to the storage 120.

According to the disclosure, as a new operation state occur, or a new sensor is added, the reference sensing data may be automatically added to the look-up table data, and there is a need for directly modifying error detection related data based every time when the home network environment is changed.

Meanwhile, the reference sensing data may store information on a time required for detecting a sensing value corresponding to the operation state before and after the operation state occurs as well as the sensing value. The reference sensing data may include time information as above. In this regard, it will be described with reference to FIG. 4.

Figure 4:
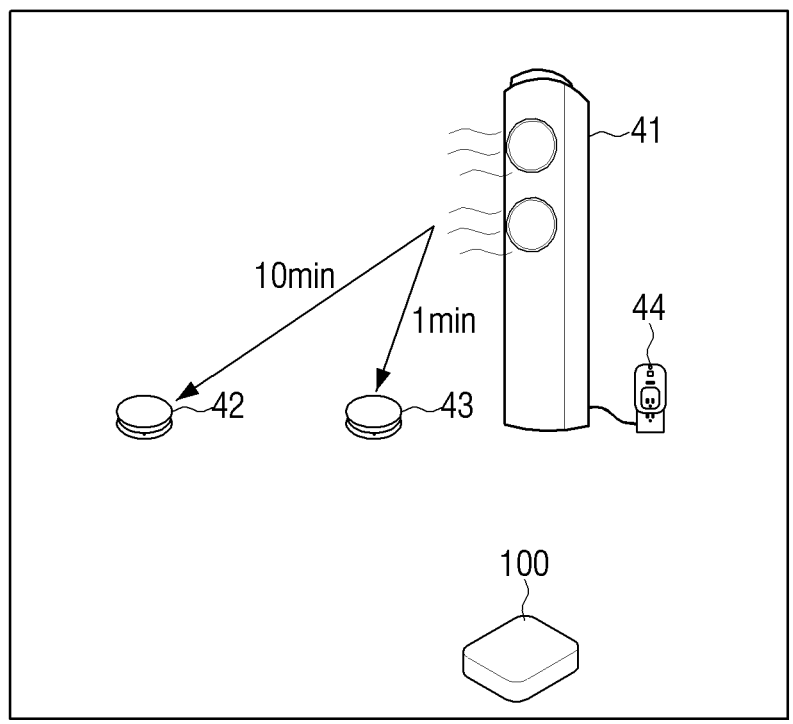

Referring to FIG. 4, information indicating that the cooling of the air conditioner 41 is started to the server 100. The state information may include information on a cooling temperature. The processor 130 may determine the operation state that the cooling of the air conditioner 41 is started based on the state information received from the air conditioner 41, and the processor 130 may analyze sensing data received from a power measurement sensor 44 and temperature sensors 42 and 43 at a time point corresponding to the determined operation state. The processor 130 may calculate the time required for detecting a temperature change in the temperature sensors 42 and 43 from a cooling start time.

Referring to FIG. 4, it takes 10 minutes for the first temperature sensor 42 to sense a temperature change, and takes 1 minute for the second temperature sensor 43. The processor 130 may store the time information as the reference sensing data of the first temperature sensor 42 and the reference sensing data of the second temperature sensor 43 corresponding to the operation state 'air conditioner cooling' in the storage 120.

After the reference sensing data is stored, when determining the operation state in which the cooling of the air conditioner 41 is operated based on the state information from the air conditioner 41, the processor 130 may compare sensing data received from the temperature sensor 42 and 43 and the power measurement sensor 44 with the stored reference sensing data.

The processor 130 may analyze the sensing data received from the first temperature sensor 42 and determine whether a temperature change is sensed within a predetermined allowable range based on 10 minutes after the cooling start point. The processor 130 may analyze the sensing data received from the second temperature sensor 43 and determine whether a temperature change is sensed within a predetermined allowable range based on 1 minute from the cooling start point. The processor 130 may compare the sensing data received from the power measurement sensor 44 with the reference sensing data of the power measurement sensor 44.

For example, when the sensing data received from the first temperature sensor 42 is analyzed, if a temperature change is not sensed within a predetermined allowable range (e.g., 9 to 11 minutes) based on 10 minutes from the cooling start point, the processor 130 may determine that the sensing data received from the first temperature sensor 42 is beyond a predetermined allowable range. The processor 130, if it is determined that the sensing data received from the second temperature sensor 42 and the sensing data received from the power measurement sensor 44 is within a predetermined allowable range of the reference sensing data, may determine that an error occurs in only the first temperature sensor 42.

FIGS. 3 and 4 describe the operation state related to a single electronic apparatus. However, the processor 130 may determine operation states of all electronic apparatuses included in a home network, and determine whether an error occurs in the apparatus based on reference sensing data corresponding to the determined operation state. For example, for a complex operation state involving the multiple electronic apparatuses such as when a TV is powered on, and an air conditioner operates cooling at the same time, the storage 120 may store reference sensing data. Therefore, the processor 130 may accurately detect errors even in a complex operation state involving multiple electronic apparatuses. In this regard, the description will be made with reference to FIG. 5.

Figure 5:
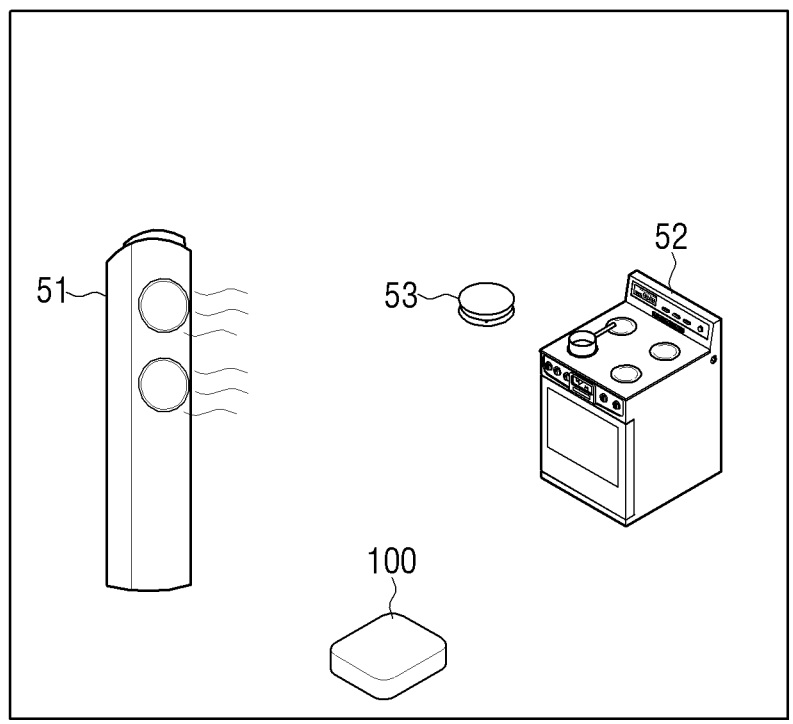

Referring to FIG. 5, the cooling of the air conditioner may be started, and food may be heated by a cooking device 52. The air conditioner 51 and the cooling device 52 may transmit state information to the server, and the processor 130 may determine a complicated operation state that the cooling of the air conditioner 51 is operated, and the food is heated by the cooking device 52 based on the state information received from the air conditioner 51 and the state information received from the cooking device 52. The processor 130 may compare the sensing data received from the temperature sensor 53 corresponding to the determined complicated operation state with the reference sensing data of the temperature sensor 53 corresponding to the complicated operation state.

The reference sensing data corresponding to such a complicated operation state may be data obtained by combining the first reference sensing data of the temperature sensor 53 corresponding to the operation state where the cooling of the air conditioner 51 is operated, and the second reference sensing data of the temperature sensor 53 corresponding to the operation state where food is heated by the cooking device 52. When such a complicated operation state occurs, the sensing data received from the temperature sensor 53 may be stored in the storage 120 as separated reference sensing data different from the first reference sensing data and the second reference sensing data.

The processor 130 may determine whether or not an error has occurred in consideration of such as a complex operation state. For example, when the air conditioner 51 operates at a 18-degree cooling mode, a sensing value corresponding to a temperature higher than a preset allowable range may be output from the temperature sensor 53 on the basis of the 18-degree cooling mode in, or even if the time taken to detect a temperature change state is increased, it may be due to the heating in the cooking device 53. Therefore, it could prevent an erroneous determination that an error has occurred in the temperature sensor 53.

It would be difficult to determine an error of a temperature sensor only by temperature value in the situation shown in FIG. 5. This is because many factors such as weather, etc. as well as a device states may affect a temperature value. Therefore, as described above, it becomes possible to detect whether an error has occurred by analyzing the rise and fall of the temperature.

FIG. 6 is a view to explain reference sensing data for each operation state that is stored in a look-up table form according to an embodiment.

Referring to FIG. 6, reference sensing data of sensors in the home network may be stored in the form of a look-up table in the storage 120 for the operation states of the electronic apparatuses in the home network. Reference sensing data (xx) of the first sensor corresponding to operation state A, reference sensing data (xxx) of the second sensor corresponding to operation state A, and reference sensing data (xxxx) of the third sensor corresponding to operation state A may be included in a look-up table. Reference sensing data (x) of the first sensor corresponding to operation state B, reference sensing data (-) of the second sensor corresponding operation state B, and reference sensing data (xx) of the third sensor corresponding to operation state B may be included in a look-up table.

For example, operation state A may correspond to the state where the TV 13 is powered on FIG. 1, and the reference sensing data (xx) of the first sensor corresponding to the operation state A may be reference sensing data of the first temperature/illumination sensor 11 when the power of the TV 13 is turned on, the reference sensing data (xxx) of the second sensor corresponding to the operation state A may be reference sensing data of the illumination sensor 14 when the TV 13 is powered on, and the reference information (xxxx) of the three third sensor corresponding to the operation state A may be reference sensing data of the second temperature/illumination sensor 17 when the power of the TV 13 is turned on.

For example, operation state B may correspond to a state in which the TV 13 is in a power saving mode, and the cooling of the air conditioner 16 is operated at the same time. The reference sensing data (xx) of the first sensor corresponding to the operation state B may be reference sensing data of the first temperature/illumination sensor 11 when the TV 13 is a power saving mode, and the cooling of the air conditioner 16 is operated, the reference sensing data (-) of the second sensor corresponding to operation state B may be reference sensing data of the illumination sensor 14 when the TV 13 is a power saving mode and the cooling of the air conditioner 16 is operated, and the reference sensing data (xx) of the third sensor corresponding to operation state B may be reference sensing data of the second temperature/illumination sensor 17 when the TV 13 is in a power saving mode, and the cooling of the air conditioner 16 is operated.

The reference sensing data of a plurality of sensors stored in the storage 120 for each operation state may include sensing data of all sensors in the home network. The reference sensing data stored in the storage 120 may be composed of sensing data of the sensors related to the operation state among the sensors included in the home network. The sensor related to the operation state may be a sensor outputting a changed sensing value corresponding to the operation state when it occurs. For example, referring to FIG. 1, if it is determined that there occurs a sensing value change at a time point corresponding to the operation state in which the cooling of the air conditioner 16 is operated operation when analyzing sensing data received from the power measurement sensor 18 and the temperature sensor 12 and 17, the processor 130 may select the power measurement sensor 18 and the temperature sensors 12 and 17 as the sensor related to the operation state in which the cooling of the air conditioner 16 is operated. The processor 130, if there seems no sensing value change of the temperature sensor 11 in a state where the cooling of the air conditioner 16 is operated, may determine that the temperature sensor 11 is not related to the operation state in which the cooling is operated.

The processor 130 may store sensing data indicating a change in sensing value at a time point corresponding to the determined operation state among the plurality of sensing data respectively received from the plurality of sensors in the storage 120 as reference sensing data corresponding to the determined operation state.

As described above, if the related sensor is designated for each operation state, when a particular operation state occurs, only the sensors related to the operation state may be selected and compared with reference sensing data. Therefore, costs for data processing may be reduced.

It has been described on the determination whether an error has occurred in an operation state involving a TV, an air conditioner, etc., but an operation state could be engaged with sensors.

The processor 130 may determine an operation state based on sensing data received from the plurality of sensors, and store the received sensing data in the storage 120 as reference sensing data corresponding to the determined operation state. The processor 130, if it is determined that the same operation state occurs again, may compare the sensing data received from the plurality of sensors with the pre-stored reference sensing data at a time point corresponding to the operation state, and determine whether errors have occurred in the plurality of sensors. The detailed example will be described with reference to FIG. 7.

Figure 7:
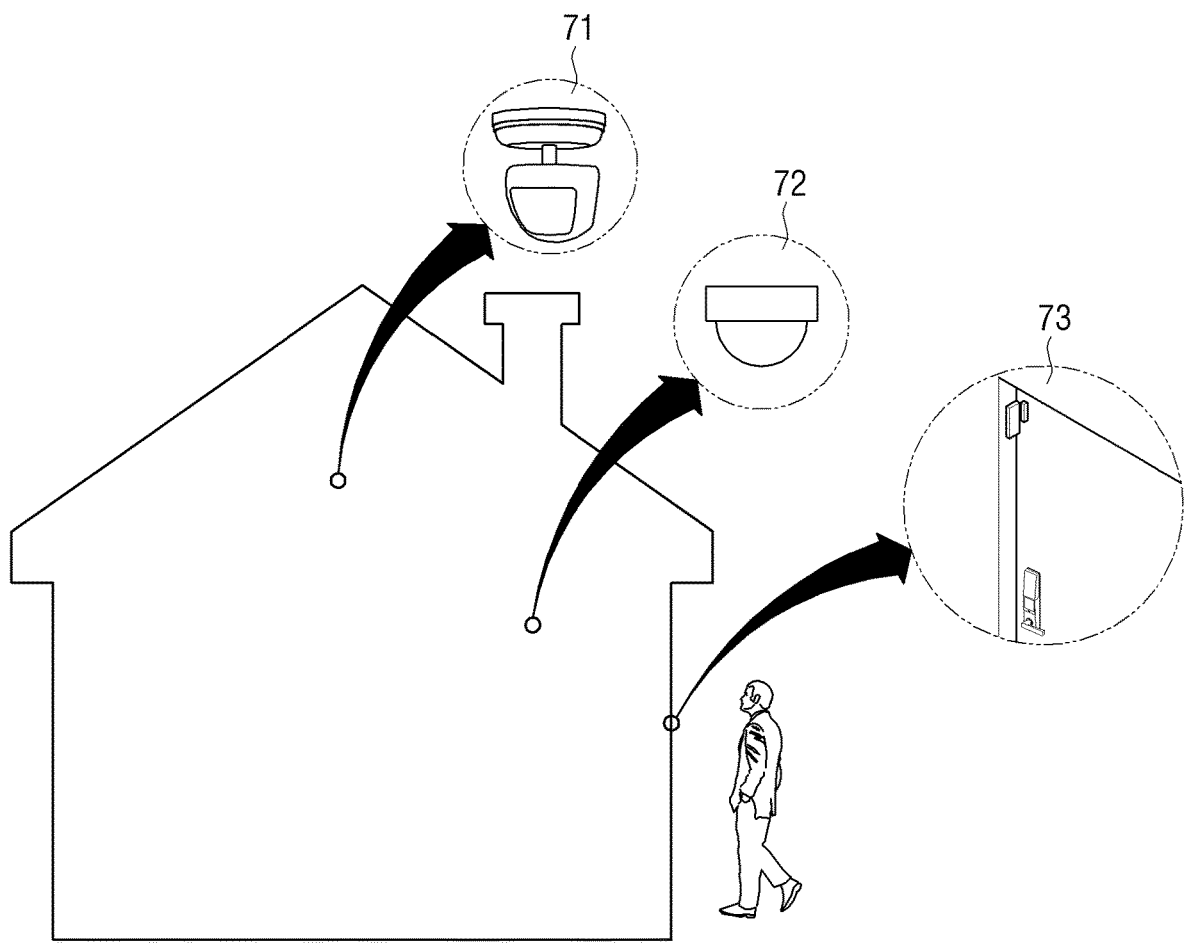
FIG. 7 is a view to explain a method for determining an error of a sensor in a specific state according to an embodiment.

FIG. 7 is a view to explain a method for determining a defect of a sensor in a specific state according to an embodiment.

Referring to FIG. 7, sensor A 73 for sensing the opening and closing of a front door may be provided in the front door, sensor B 72 for sensing a motion may be provided in the doorway of the house, and sensor 71 C for sensing presence may be provided in the house. The state of sensing presence by the sensor C 71 may be a state 'someone comes in the house'. In this state, the sensor A 73 may sense the opening and closing the front door, and the sensor B 72 may sense a motion. Therefore, sensing data generated from each of the sensor B 72 and the sensor A 73 at a time point corresponding to the state of sensing presence by the sensor C 71 may be reference sensing data corresponding to the state of sensing presence by the sensor C 71, and it may be stored in the storage 120.

The processor 130 may determine which sensor is defective among a plurality of sensors based on reference sensing data. The processor 130, if presence is sensed by the sensor C 71, may determine that 'someone comes in the house', compare sensing data respectively received from each of the sensor B 72 and the sensor A 73 at a time point corresponding to the determined state with the reference sensing data of the sensor B 72 and the reference sensing data of the sensor A 73, and determine whether the received sensing data is within an allowable range of the reference sensing data.

As a result of determination, the data received from sensor A may be within a predetermined allowable range of the reference sensing data. If it is determined that the data received from sensor B is out of a predetermined allowable range of the reference sensing data of the sensor B, it can be seen that the error has occurred in the sensor B. In other words, when a person comes in the house, the sensor A may sense the closing and opening of the front door, and the sensor C may sense the presence. Therefore, the sensor B fails to sense a motion, and it means that an error has occurred in the sensor B.

A method for determining which device has an error will be described in detail based on the result of comparing reference sensing data with the received sensing data.

The processor 130 may determine the operation status of at least one electronic apparatus in a home network, identify whether each of the sensing data received from the plurality of sensors is within a predetermined allowable range of a plurality of sensor-specific reference sensing data corresponding to the determined operation state, and determined whether an error has occurred in the plurality of sensors and the at least one electronic apparatus based on the determination.

If a sensor out of the predetermined allowable range among the plurality of sensors is a predetermined ratio or more, the processor 130 may determine that an error has occurred in the at least one electronic apparatus related to the determined operation state. The processor 130, if a sensor out of the predetermined allowable range is the predetermined ration or less among the plurality of sensors, may determine an error has occurred in the sensor out of the predetermined allowable range. The example embodiment will be described with reference to FIG. 4.

Referring to FIG. 4, when the processor 130 determines that the air conditioner 41 operates in a cooling mode, and compare sensing data received from the sensors related to the determined operation state, that is, three sensors such as the first temperature sensor 42, the second temperature sensor 43, and the power measurement sensor 44 with reference sensing data corresponding to the operation state where the air conditioner 41 of each of the three sensors operates in a cooling mode for each sensor.

The processor 130 may determine whether each of the sensing data received from the threes sensor is within a predetermined allowable range, and determine whether a ratio of a sensor out of the predetermined allowable range is a predetermined ratio or less. When the ratio is set to be 2/3, and sensing data of one of the three sensors is out of an allowable range of reference sensing data, the processor 130 may determine that an error has occurred in the sensor. The processor 130, if it is determine that sensing data of two or more of sensors are out of the allowable range of the reference sensing data, may determine that the cooling function of the air conditioner 31 has an error.

A predetermined allowable range, which is the reference of the comparison operation, may be a predetermined error range. A predetermined ratio to be the reference of the comparison operation may be determined according to the total number of sensing data which is to be compared. For example, when the total number of sensing data which is to be compared is 5 (five), the ratio may be determined to be 3/5, and if the total number of sensing data to be compared is 2 (two), the ratio may be determined to be 2/2. A predetermined ratio may be determined to compare scores based on information on the inconsistency. For example, although the number of sensing data to be compared is 2 (two) in total, the ratio may be set to 1.5/2.

In the above-example embodiment, it has been described that if a sensor out of the predetermined allowable range among the plurality of sensors is a predetermined ratio or less, the sensor out of the predetermined allowable range is determined to have an error. However, according to another example embodiment, an error determination process for the sensor may be performed again rather than determining that the sensor has an error. In this regard, the description will be made with reference to FIG. 10.

Figure 10:
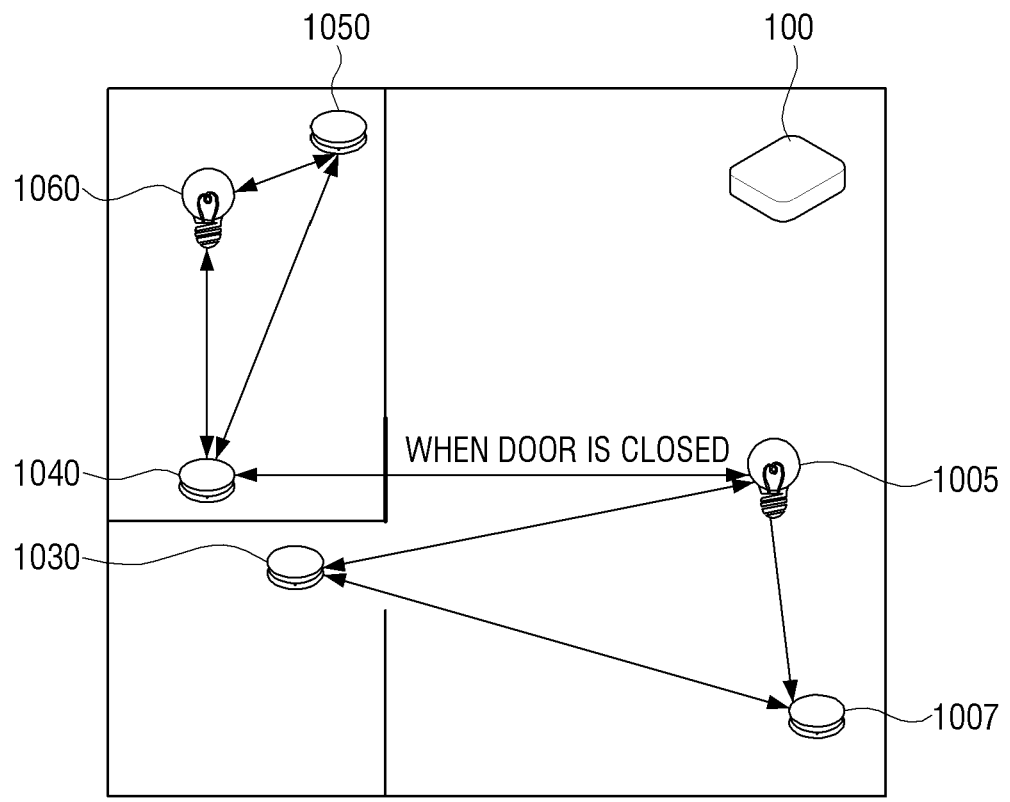
FIG. 10 is a view to explain an error determination process according to an embodiment.

FIG. 10 is a view to explain an error determination process according to an embodiment.

Referring to FIG. 10, when determining an operation state in which a first bulb 1005 is turned on, the processor 130 may compare sensing data received from sensors involving the determined operation state, that is, a first illumination sensor 1007, a second illumination sensor 1030, and a third illumination sensor 1040, with the reference sensing data corresponding to the operation state in which the first bulb 1005 of each of the three sensors is turned on.

The processor 130 may determine whether each of sensing data received from the three sensors is within a predetermined allowable range of each of the three reference sensing data, and whether a ratio of the sensor out of the predetermined allowable range is a predetermined ratio or less. If the ratio is set to be 2/3, and sensing data of the sensor of the third illumination sensor 1040 of the three sensors is out of the allowable range of the reference sensing data, the processor 130 may determine that an error has occurred in the third illumination sensor 1040.

The processor 130 may perform an error determination process with respect to the third illumination sensor 1040 determined to have an error.

When determining an operation state in which a second bulb 1060 is turned on at a different time point, the processor 130 may compare sensing data received from sensors involving the determined operation state, that is, the third illumination sensor 1040 and the fourth illumination sensor 1050, with reference sensing data corresponding to an operation state in which the second bulb 1060 of each of the two sensors is turned on, for each sensor. The processor 130 may determine whether each of the sensing data received from the two sensors is within a predetermined allowable range of each of the two reference sensing data, and if it is within a predetermined allowable range, may determine that an error has not occurred in the third illumination sensor 1040 determined to possibly have an error.

Referring to FIG. 10, according to the above-described example, when the third illumination sensor 1040 is not able to sense the turning on of the first bulb 1005 because the door of the room having the third illumination sensor 1040 is closed although the first bulb 1005 is turned on, it may prevent a sudden determination that an error has occurred in the third illumination sensor 1040. In other words, whether an error has occurred in a sensor may be determined more accurately by going through error determination processes several times.

Figure 8:
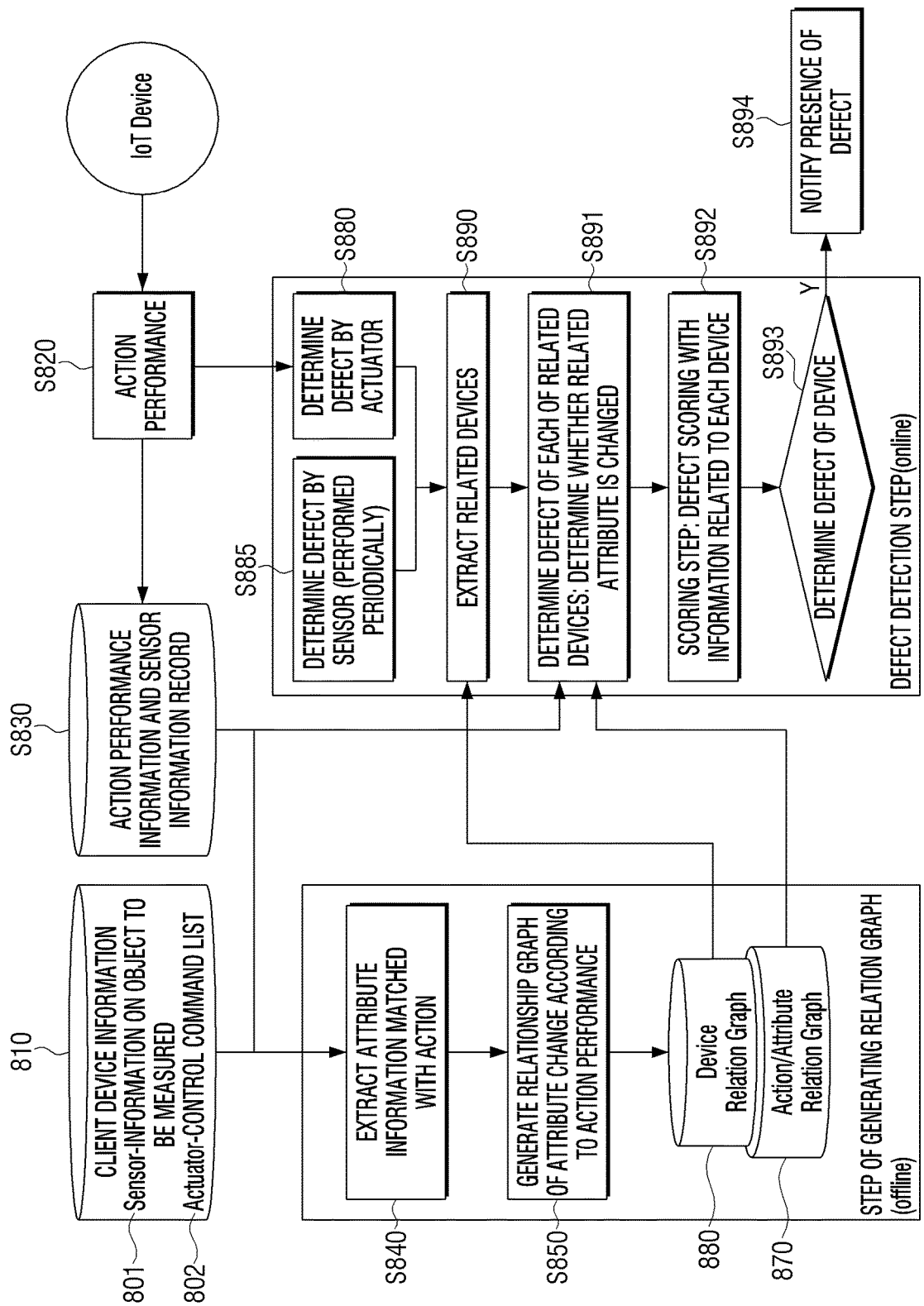
FIG. 8 is a flowchart to explain a method of a server for determining an error according to an embodiment.

FIG. 8 is a flowchart to explain a method of a server for determining an error according to an embodiment.

Referring to FIG. 8, information 810 of client devices (or IoT devices) may be stored in the storage 120 of the server 100. The client devices may be divided into sensors and actuators. The sensor may be a device for sensing temperature, humidity, motion, presence, power consumption, etc. and the actuator may be a device for performing a particular function and stimulating an environment change that can be sensed by the sensor, for example, a TV, an air conditioner, a cooking device, etc.

The information 810 of the client devices may include information on an object to be measured by the sensor and a control command list for controlling an actuator.

When determining an operation performance state (action performance) of the client devices (IoT devices) at step S820, the server 100 may record information on the determined operation state (or action performance information) and sensing data (or sensing information) of a sensor during the operation state in the storage 120 at step S830. The server 100 may analyze the recorded information and extract information of attributes of the sensing data generated by the sensor during the operation state (the action performance) at step S840.

The attribute of the sensing data may include a sensing value of the sensor corresponding to the action performance and/or a time taken until the sensing value is measured after the action performance. For example, referring to FIG. 4, sensing values (temperature values) of the temperature sensors 42 and 43 corresponding to the operation state in which the cooling of the air conditioner 41 is operated, and information on the time (10 minutes and 1 minute) taken until the temperature change is sensed by the temperature sensors 42 and 43 may be extracted. For another example, referring to FIG. 6, the sensing values of the motion sensor 72 and the front door opening and closing detection sensor 73 may be extracted at a time point corresponding to the operation state in which the presence is sensed by the presence sensor 71. The information on the time taken to detect the motion or to detect the door opening and closing by the motion sensor 72 and the front door opening and closing detection sensor 73 may be extracted before and after the presence is detected by the presence sensor 71.

The server 100 may generate a relationship graph with respect to the change of attributes of sensing data generated by a plurality of sensors corresponding to the operation state at step S850. For example, referring to FIG. 4, the server 100 may generate a graph defining the relationship between the attributes of a plurality of sensing data generated by each of the plurality of temperature sensors 42 and 43 when the cooling of the air conditioner 41 is operated. For another example, referring to FIG. 7, the server 100 may generate a graph defining the relationship between the attributes of the sensing data generated by the motion sensor 72 and the front door opening and closing detection sensor 73 when the presence of the presence sensor 71 is sensed.

The server 100 may store the generated relationship graph 870 in the storage 120. The server 100 may store information 880 on the sensors related to the operation state (or action) in the storage 120. For example, referring to FIG. 7, the server 100 may store information on the motion sensor 72 and the front door opening and closing detection sensor 73 in relation to the action of sensing the presence.

Such the stored information may be used for error detection when the same operation state is determined later on. Establishing such the information may be performed off-line.

Hereinafter, an error detection operation will be described. The error detection operation may be performed on-line.

When determining operation performance (action performance) states of the client devices (IoT devices) are determined at step 820, the server 100 may perform an operation to determine whether a defect (or an error) has occurred in an actuator related to the operation state at step S880. For example, when the operation state in which the cooling of the air conditioner is determined, the server 100 may determine whether an air conditioner is defective. When a sensor, not an actuator is related to the determined operation state, the server 100 may perform an operation whether the sensor is defective at step S885. Whether the sensor is defective may be performed periodically, rather than whenever the operation state is determined.

The server 100 may extract the device related to the operation state at step S890. The server 100 may determine whether each related device is defective at step S891. Specifically, the server 100 may compare the change in attribute of the sensing data 830 received at the sensor related to the operation state with a pre-stored relationship graph 870.

The server 100 may give scores based on information on the degree of inconsistency between the compared sensing data at step S892, and determine whether the device related to the operation state is defective at step S893. As a result of determination, when it is defective, information on the defect may be notified to a user terminal device at step S894.

The server 100 may transmit information on a device determined to have an error to a user terminal device. In this case, the server 100 may notify the user terminal device of the information only when the number of states to have an error exceeds a predetermined number.

Not only information on the device having an error, but the server 100 may transmit information on the determined operation state to the user terminal device. For example, referring to FIG. 4, the server 100 may transmit information that the operation state of the cooling of the air conditioner 41 has occurred and the information notifying that an error has occurred in the first temperature sensor 42 to the user terminal device.

Figure 9:
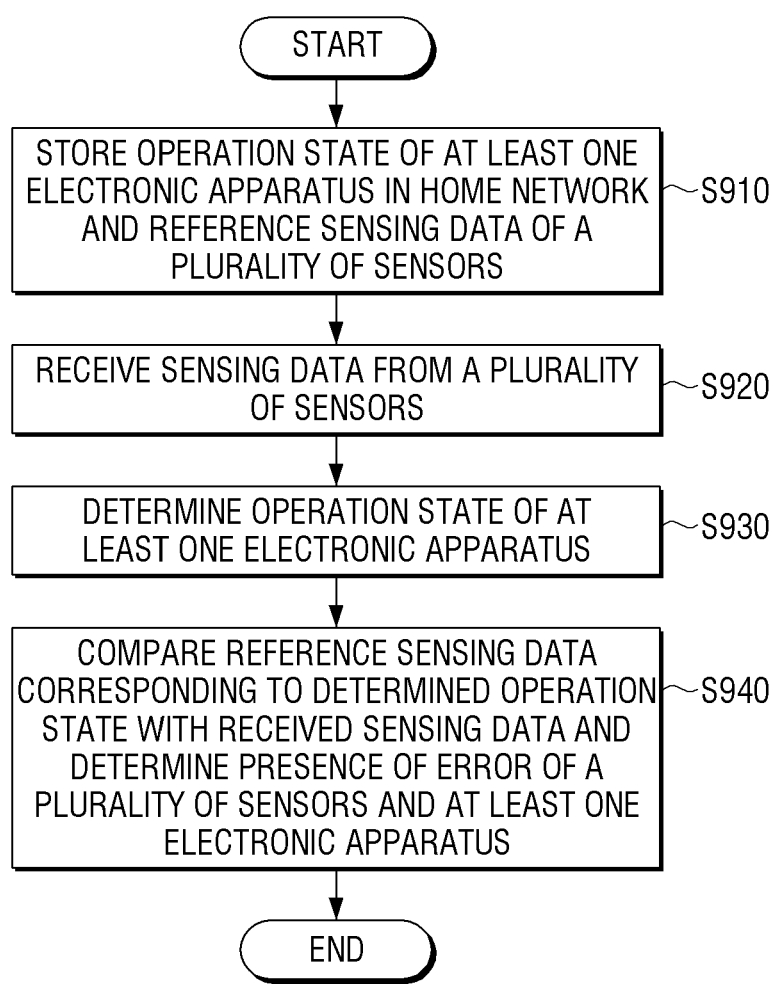
FIG. 9 is a flowchart to explain a controlling method of a server according to an embodiment.

FIG. 9 is a flowchart to explain a controlling method of a server according to an embodiment.

Referring to FIG. 9, the server 100 may store the operation state of at least one electronic apparatus in a home network and a plurality of sensor-specific reference sensing data at step S910.

In this case, reference sensing data of each of the plurality of sensors may be stored in a look-up table form for each operation state.

When the operation state of the at least one electronic apparatus is determined as a new operation state, the server 100 may store sensing data received from each of the plurality of sensors as reference sensing data corresponding to the new operation state at a time point corresponding to the new operation state.

The server 100 may store only the sensing data related to the determined operation state as reference sensing data instead of storing all the sensing data received from each of the plurality of sensors as reference sensing data.

The server 100 may determine sensing data showing a change in sensing value at a time point corresponding to the determined operation state as sensing data related to the operation state. For example, when a change in sensing value due to a temperature appears in the sensing data received from a specific temperature sensor at a specific operation state, and a change in sensing value due to a brightness change appears in sensing data received from a specific illumination sensor, the server 100 may determine the sensing data received from the specific temperature sensor and the specific illumination sensor at a specific operation state as sensing data related to the specific operation state.

When an operation state of at least one electronic apparatus in a home network is determined as a new operation state, the server 100 may sensing data showing a change in sensing value at a time point corresponding to the new operation state among a plurality of sensing data received from each of the plurality of sensors as reference sensing data corresponding to the new operation state.

After a new sensor is registered in a home network, the server 100, when the operation state of the at least one electronic apparatus is determined, may store sensing data received from the new sensor at a time point corresponding to the determined operation state as reference sensing data of the new sensor with respect to the determined operation state.

The server 100 may receive sensing data from a plurality of sensors in a home network at step S920. The server 100 may continuously receive and store sensing data from the plurality of sensors. The server 100 may receive and store sensing data from the plurality of sensors at a predetermined period.

The server 100 may determine the operation state of at least one electronic apparatus in a home network at step S930.

The server 100 may determine the operation state based on the state information received from the at least one electronic apparatus.

The server 100 may compare the stored reference sensing data corresponding to the determined operation state with the received sensing data at step S940.

The server 100 may compare the plurality of sensing data stored for each of the plurality of sensors corresponding to the determined operation state with a plurality of sensing data received from the plurality of sensors and determine an error of the plurality of sensors and the at least one electronic apparatus at step S950.

The server 100 may determine whether each of the sensing data received from the plurality of sensors is within a predetermined allowable range of the plurality of sensor-specific reference sensing data corresponding to the determined operation state, and determine whether an error occurred the plurality of sensors and the at least one electronic apparatus based on the determination.

In this case, the difference between the reference sensing data and the received sensing data may be calculated, and if the difference is within a predetermined error range, it may be determined that the received sensing data is within the predetermined allowable range of the reference sensing data.

The server 100 may determine, when a sensor out of the predetermined allowable range among the plurality of sensors is a predetermined ratio or more, that an error has occurred in the at least one electronic apparatus, and if the sensor out of the predetermined allowable range among the plurality of sensors is the predetermined ratio or less, may determine that an error has occurred in the sensor out of the predetermined allowable range.

The ratio may be determined according to the number of sensors to be compared. For example, when the number of sensors to be compared is 3 (three), the ratio may be set to be 2/3, and the number of sensors to be compared is 4 (four), the ratio may be set to be 3/4. When the number of sensors to be compared 5 (five), the ratio may be set to be 3/5. The values obtained from reference scores of respective devices may be used as a ratio. For example, when the number of sensors to be compared is 3 (three), and each reference score is 0.8, 0.5 and 0.2, the ratio may be set to be 1.5/3. However, the disclosure is not limited to the ratio.

The server 100 may transmit information on the device determined to have an error among the at least one electronic apparatus and the plurality of sensors to a user terminal device.

The user terminal device may be equipped within a display, and according to the information received from the server 100, the display of the user terminal device may display information of the device such as the name of the device having an error, the type of the device having an error, the date when the device with an error is initially registered to a home network, etc.

The server 100 may transmit not only the information on the device determined having an error among the at least one electronic apparatus and the plurality of sensors, but the information on the determined operation state to a user terminal device.

In an environment where various types of devices exist in a house, it would be difficult to identify where the device having an error is arranged only with the device information. However, according to an embodiment, a user may easily retrieve a device having an error in consideration of the operation state in which an error has been recognized. For example, the server 100 may transmit a message such as 'the occurrence of the error in the temperature sensor A is sensed in the state of the cooling of the air conditioner' to a user terminal device, and the user terminal device may display the received message. Based on the message, the user may identify the temperature sensors in the room with the air conditioner and retrieve the temperature sensor A having an error.

According to various embodiments, in an IoT environment with multiple devices, the maintenance of the devices could be easily performed. According to the above-described various embodiments, a user may easily identify whether an error has occurred in devices a user cannot easily identifying the error, and the function of the electronic apparatus that the user cannot easily recognize its malfunction, for example, a power saving mode. Most of all, data base needed for detecting whether an error has occurred may be automatically built during a process of using a device. Therefore, there is an advantage in that it does not take time and effort to create a data base separately. In addition, according to the disclosure, a database for error detection suitable for each environment may be constructed even in a non-standardized IoT environment in which functions can be freely given to devices.

The processor 130 of the server according to an embodiment may determine whether an error has occurred in the plurality of sensors and the electronic apparatus using a training algorithm, and provide information on the determination result to the user.

Figure 11:
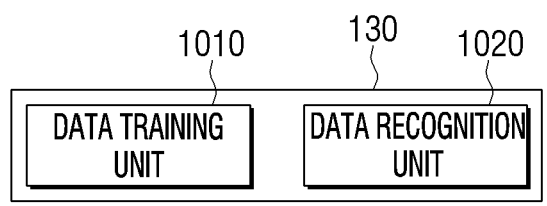
FIG. 11 to FIG. 13 are views illustrating a data training unit and a data recognition unit generated by a processor of a server according to an embodiment.
Figure 12:
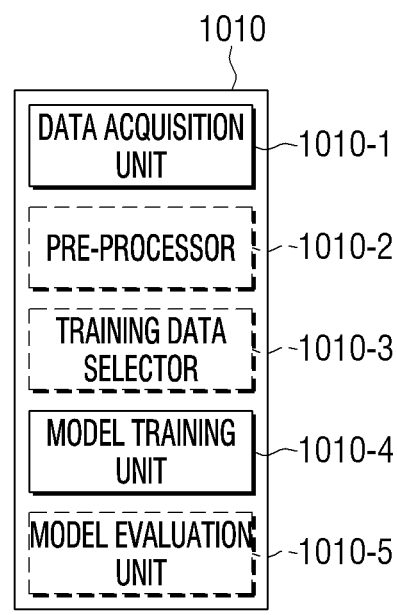

FIG. 11 to FIG. 13 are views illustrating a data training unit and a data recognition unit generated by a processor of a server according to an embodiment.

Referring to FIG. 11, the processor 130 according to an embodiment may include a data training unit 1010 and a data recognition unit 1020.

The data training unit 1010 may generate or train a data recognition model to have criteria for determining whether an error has occurred in the plurality of sensors and the electronic apparatus. For determining a predetermined state, the data training unit 1010 may apply training data to the data recognition model, and generate a data recognition module having determination criteria.

For example, the data training unit 1010 may generate or train the data recognition model using the state information of the plurality of sensors and the electronic apparatus as training data.

The data recognition unit 1020 may determine a state based on recognition data. The data recognition unit 1020 may determine whether the client devices are defective based on predetermined recognition data using the trained data recognition model. The data recognition unit 1020 may obtain predetermined recognition data according to predetermined criteria and apply the obtained recognition data to a data recognition model as an input value to determine or estimate whether an error has occurred in the plurality of sensors and the electronic apparatus based on the predetermined recognition data.

In addition, a result value output obtained by applying the obtained recognition data to the data recognition model as an input value may be used for renewing the data recognition model.

The data recognition unit 1020 may obtain the result whether the client devices are defective by applying the state information of the client devices to the data recognition model as input values.

At least part of the data training unit 1010 and at least part of the data recognition unit 1020 may be embodied as a software module or at least one hardware chip to be mounted on the electronic apparatus. For example, at least one of the training unit 1010 and the response unit 1020 may be manufactured as a hardware chip for artificial intelligence (AI), or part of a conventional general processor (e.g., a CPU or an application processor), or a graphic processor (e.g., a CPU) to be mounted on a server as described above. A hardware chip for artificial intelligence may be a processor specialized for probability calculation, and has a higher capacity of parallel processing than a conventional general process to quickly process an operation in the artificial intelligence field such as machine training. When the data training unit 1010 and the data recognition unit 1020 are embodied as a software module (or a program module including instruction), a software module may be stored in a non-transitory computer readable media than is readable by a computer. In this case, the software module may be provided by an operating system (OS) or a predetermined application. Part of the software module may be provided by the operating system (OS), and the reminder may be provided by the predetermined application.

FIG. 12 is a block diagram of a data training unit 1010 according to an embodiment.

Referring to FIG. 12, the data training unit 1010 may include a data acquisition unit 1010-1 and a model training unit 1010-4. In addition, the data training unit 1010 may selectively include at least one of a pre-processor 1010-2, a training data selector 1010-3, and a model evaluation unit 1010-5.

The data acquisition unit 1010-1 may obtain training data necessary for training to determine whether the client devices are defective.

The training data may be data collected or tested by a manufacturer of the data training unit 1010 or the client devices. For example, the training data may include sensing data of the sensors and information on the operation state of the electronic apparatus. In other words, the training data may include operation state information of the electronic apparatus and sensing data.

The model training unit 1010-4 may train the data recognition model to have determination criteria on how to determine whether the client devices are defective using the training data. For example, the model training unit 1010-4 may train the data recognition model through supervised learning using at least part of the training data as determination criteria. In addition, the model training unit 1010-4, for example, may train itself using the training data without an additional guideline, and train the data recognition model through unsupervised leaning that identifies the determination criteria for determining whether an error has occurred in the client devices.

In addition, the model training unit 1010-4 may training selection criteria on which training data to use for determining whether the client devices are defective.

The model training unit 1010-4 may generate or train the data recognition model using the operation state information of the electronic apparatus and sensing data of the plurality of sensors as training data.

Meanwhile, the data recognition model may be established in advance, and updated by the training of the model training unit 1010-4. In this case, the data recognition model could be pre-established by receiving basic training data (e.g., state information of the electronic apparatuses and sensing data of the plurality of sensors).

The data recognition model may be configured in consideration of the application field of a recognition model, the purpose of training, or the computer performance of a device. The data recognition model may be, for example, a model based on a neural network. The data recognition model may be designed to simulate the human brain structure on a computer. The data recognition model may include a plurality of weighted network nodes that simulate neurons of a human neural network. A plurality of network nodes may each establish a connection relationship to simulate a synaptic activity of neurons sending and receiving signals via synapses.

The data recognition model may include, for example, a neural network model or a deep-learning model developed from the neural network model. In the deep-learning model, a plurality of network nodes may be located at different depths (or layers), and exchange data according to a convolution connection relationship.

For example, models such as Deep Neural Network (DNN), Recurrent Neural Network (RNN), and Bidirectional Recurrent Deep Neural Network (BRDNN) may be used as a data recognition model, but the present invention is not limited thereto.

According to various embodiments, the model training unit 1010-4, when the pre-established data recognition models are in plural, may determine a data recognition model having a large relevance between the input training data and the basic training data as a data recognition model to be trained. In this case, the basic training data may be pre-classified by data type, and the data recognition model may be established in advance by data type. For example, the basic training data may be pre-classified based on various criteria such as the an area where the learning data is generated, a time at which the learning data is generated, a size of the learning data, a genre of the learning data, a creator of the learning data, etc.

The model training unit 1010-4, for example, may train a data recognition model using a training algorithm, etc. including an error back-propagation or a gradient descent.

In addition, the model training unit 1010-4 may train the data recognition model through a supervision training using the determination reference as an input value for training. The model training unit 1010-4, for example, may train itself using necessary training data without an additional guide, and train the data recognition model through a non-provision training to find determination criteria for judging a state. The model training unit 1010-4, for example, may train the data recognition model through reinforcement learning using the feedback whether the result of determining the state according to training is appropriate.

In addition, when the data recognition model is trained, the model training unit 1010-4 may store the trained data recognition model. In this case, the model training unit 1010-4 may store the trained data recognition model in the memory of the server 130.

The data training unit 1010 may further include the pre-processor 1010-2 and the training data selector 1010-3 to improve the recognition result of the data recognition result or saving resources or time for generating the data recognition model.

The pre-processor 1010-2 may preprocess the data obtained from the data acquisition unit 1010-1 to be used for training for determining whether the client devices are defective.

For example, the pre-processor 1010-2 may manufacture the obtained data in a pre-defined format, so that the model training unit 1010-4 may easily use the data for training of the data recognition model. The pre-processed data may be provided to the model training unit 1010-4 as training data.

The training data selector 1010-3 may optionally select training data required for training among the pre-processed data. The selected training data may be provided to the model training unit 1010-4. The training data selector 1010-3 may select training data necessary for training among the pre-processed data according to predetermined selection criteria. The training data selector 1010-3 may select training data necessary for training according to predetermined selection criteria by the training of the model training unit 1010-4. According to an embodiment, the training data selector 1010-3 may select sensing data related to a specific client device among the input sensing data.

The data training unit 1010 may further include a model evaluation unit 1010-5 to improve the recognition result of the data recognition model.

The model evaluation unit 1010-5 may input evaluation data to the data recognition model, and when the recognition result output from the evaluation data fails to satisfy predetermined criteria, may allow the model training unit 1010-4 to train again. In this case, the evaluation data may be data predefined for evaluating the data recognition model.

For example, the model valuation unit 1010-5, when the number or the ratio of evaluation data with inaccurate recognition result among the recognition results of the data recognition model trained with respect to the evaluation data exceeds a predetermined threshold value, may determine that the data fails to satisfy predetermined criteria. For example, when a predetermined criterion is determined as 2%, and the trained data recognition model outputs the incorrect recognition result with respect to the evaluation data exceeding 20 out of 1000 evaluation data, the model evaluation unit 1010-5 may estimate that the trained data recognition model is not appropriate.

When there are a plurality of trained data recognition models, the model evaluation unit 1010-5 may estimate whether each trained data recognition model satisfies predetermined criteria, and determine the model satisfying the predetermined criteria as a final data recognition model. In this case, when a model satisfying predetermined criteria has a plurality of models, the model evaluation unit 1010-5 may determine any one or a predetermined number of models preset in the order of highest evaluation scores as a final data recognition model.

At least one of the data acquisition unit 1010-1, the pre-processor 1010-2, the training data selector 1010-3, the model training unit 1010-4, and the model evaluation unit 1010-5 may be embodied as a software module, or manufactured in the form of at least one hardware chip and mounted on a server. For example, at least one of the data acquisition unit 1010-1, the pre-processor 1010-2, the training data selector 1010-3, the model training unit 1010-4, and the model evaluation unit 1010-5 may be manufactured in the form of hardware chip for artificial intelligence (AI), or part of a conventional general purpose processor (e.g., a CPU or an application processor), or a graphic processor (e.g., a GPU) and mounted on the server.

At least one of the data acquisition unit 1010-1, the pre-processor 1010-2, the training data selector 1010-3, the model training unit 1010-4, and the model evaluation unit 1010-5 may be implemented with a software module. In the case where at least one of the data acquisition unit 1010-1, the pre-processor 1010-2, the training data selector 1010-3, the model training unit 1010-4, and the model evaluation unit 1010-5 is embodied with a software module (or, a program module including instructions), the software module may be stored on a non-transitory computer-readable recording medium. At least one software module may be provided by an Operating System (OS) or by a predetermined application. Alternatively, part of the at least one software module may be provided by the OS and part of the remaining may be provided by the predetermined application.

FIG. 13 is a block diagram of a data recognition unit 1020 according to an embodiment.

Referring to FIG. 13, the recognition unit 1020 according to an embodiment may include the data acquisition unit 1020-1 and the recognition result provider 1020-4. The data recognition unit 1020 may include selectively include at least one of the pre-processor 1020-2, the recognition data selector 1020-3, and the model renewing unit 1020-5.

The data acquisition unit 1020-1 may obtain recognition data necessary for determining whether the client devices are defective.

The recognition provider 1020-4 may apply the data obtained from the data acquisition unit 1020-1 to the trained data recognition model as an input value and determine whether the client devices are defective. The recognition result provider 1020-4 may provide the recognition result according to the recognition purposed of data. The recognition result provider 1020-4 may apply the data pre-processed by the pre-processor 1020-2 to the trained data recognition model as an input value to provide a recognition result. The recognition result provider 1020-4 may apply the data selected by the recognition data selector 1020-3 to the data recognition model as an input value to provide a recognition result.

The data recognition result 1210 may further include the pre-processor 1020-2 and the recognition data selector 1020-3 to improve the recognition result of the data recognition model and to save the resources or time for providing the recognition result.

The preprocessor 1020-2 may pre-process the data obtained from the data acquisition unit 1020-1 for using the determination whether an error has occurred in the electronic apparatus.

The pre-processor 1020-2 may manufacture the obtained data in a pre-defined format so that the recognition result provider 1020-4 may easily use data for determining a state. According to an embodiment, the data acquisition unit 1020-1 may obtain sensing data of the plurality of sensors for determining whether the client devices are defective, and as described above, the pre-processor 1020-2 may pre-process the sensing data in a pre-defined format.

The recognition data selector 1020-3 may select recognition data necessary for determining a state among the pre-processed data. The selected recognition data may be provided to the recognition result provider 1020-4. The recognition data selector 1020-3 may select recognition data necessary for determining whether the client devices are defective among the pre-processed data according to predetermined criteria. The recognition data selector 1020-3 may select data according to predetermined criteria by the training of the model training unit 1010-4.

The model renewing unit 1020-5 may control the data recognition model to be renewed based on the evaluation of the recognition result provided from the recognition result provider 1020-4. For example, the model renewing unit 1020-5 may provide the recognition result provided from the recognition result provider 1020-4 to the model training unit 1010-4, so that the model training unit 1010-4 may renew the data recognition model.

Meanwhile, the various embodiments described above can be implemented using software, hardware, or a combination thereof. According to a hardware implementation, the embodiments described in this disclosure may be implemented as application specific integrated circuits (ASICs), digital signal processors (DSPs), digital signal processing devices (DSPDs), programmable logic devices (PLDs) programmable gate arrays, a processor, a controller, a micro-controller, a microprocessor, and an electrical unit for performing other functions. In some cases, example embodiments in this specification may be embodied as the processor 130 itself. According to software implementation, embodiments such as the procedures and functions described herein may be implemented in separate software modules. Each of the software modules may perform one or more of the functions and operations described herein.

Meanwhile, the method according to various embodiments of the disclosure described above may be stored in a non-transitory readable medium. Such non-transiently readable media can be mounted and used in various devices.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

According to an embodiment, the method according to various embodiments disclosed herein may be provided in a computer program product.

A computer program product may be traded between a seller and a purchaser as a commodity.

For example, a computer program product may include a product in the form of S/W program (e.g., a downloadable app) distributed on-line through a manufacture and an electronic market (e.g., google play store, app store, etc.). In the case of on-line distribution, at least a portion of the S/W program may be stored, or temporarily created. In this case, a storage medium may be a storage medium of a server of a manufacturer or an electronic market, or a relay server.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. A server for managing a home network, comprising:
    a storage configured to store at least one operation state of at least one electronic apparatus in the home network and reference sensing data for a plurality of sensors corresponding to the at least one operation state of the at least one electronic apparatus;
    a communicator configured to receive a plurality of sensing data from the plurality of sensors; and
    a processor configured to:
    determine a first operation state of the at least one electronic apparatus, and
    determine whether each of the received plurality of sensing data is within a predetermined allowable range of the stored reference sensing data by comparing the stored reference sensing data corresponding to the at least one operation state with the received plurality of sensing data corresponding to the determined first operation state,
    based on a ratio value of a first number of the plurality of sensors of which the plurality of sensing data is beyond the predetermined allowable range of the stored reference sensing data to a second number of the plurality of sensors being a predetermined ratio value or more, determine that an error occurs in the at least one electronic apparatus, and
    based on the ratio value of the first number of the plurality of sensors of which the plurality of sensing data is beyond the predetermined allowable range of the stored reference sensing data to the second number of the plurality of sensors being less than the predetermined ratio value, determine that the error occurs in the plurality of sensors.

2. The server as claimed in claim 1, wherein the processor is further configured to:
    determine a source of the error based on determining whether said each of the plurality sensing data received from the plurality of sensors is within the predetermined allowable range of the stored reference sensing data for each of the plurality of sensors corresponding to the determined first operation state.

3. The server as claimed in claim 1, wherein the processor is further configured to, based on the first operation state of the at least one electronic apparatus being a new operation state, store the plurality of sensing data received from each of the plurality of sensors at a time point corresponding to the new operation state in the storage as a new reference sensing data corresponding to the new operation state.

4. The server as claimed in claim 1, wherein the processor is further configured to, based on the first operation state of the at least one electronic apparatus being a new operation state, store the plurality of sensing data indicating a change in sensing value at a time point corresponding to the new operation state among the plurality of sensing data respectively received from the plurality of sensors in the storage as a new reference sensing data corresponding to the new operation state.

5. The server as claimed in claim 1, wherein the processor is further configured to, based on the first operation state of the at least one electronic apparatus being determined after a new sensor is registered in the home network, store a new sensing data received from the new sensor at a time point corresponding to the determined first operation state in the storage as a new reference sensing data of the new sensor with respect to the determined first operation state.

6. The server as claimed in claim 1, wherein the processor is further configured to:
    receive state information from the at least one electronic apparatus, and
    determine the first operation state of the at least one electronic apparatus based on the received state information.

7. The server as claimed in claim 1, wherein the processor is further configured to control the communicator to transmit information on a device determined to have the error among the at least one electronic apparatus and the plurality of sensors to a user terminal device.

8. The server as claimed in claim 1, wherein the processor is further configured to control the communicator to transmit information on the determined first operation state to a user terminal device along with information on a device determined to have the error among the at least one electronic apparatus and the plurality of sensors.

9. A method of a server for managing a home network, the method comprising:
    storing at least one operation state of at least one electronic apparatus in the home network and reference sensing data for each of a plurality of sensors corresponding to the at least one operation state of the at least one electronic apparatus;

receiving a plurality of sensing data from the plurality of sensors;

determining a first operation state of the at least one electronic apparatus;

determining whether each of the received plurality of sensing data is within a predetermined allowable range of the stored reference sensing data by comparing the stored reference sensing data corresponding to the at least one operation state with the received plurality of sensing data corresponding to the determined first operation state;

based on a ratio value of a first number of the plurality of sensors of which the plurality of sensing data is beyond the predetermined allowable range of the stored reference sensing data to a second number of the plurality of sensors being a predetermined ratio value or more, determining that an error occurs in the at least one electronic apparatus, and based on the ratio value of the first number of the plurality of sensors of which the plurality of sensing data is beyond the predetermined allowable range of the stored reference sensing data to the second number of the plurality of sensors being less than the predetermined ratio value, determining that the error occurs in the plurality of sensors.

10. The method as claimed in claim 9 further comprising:

identifying whether the error occurs based on determining whether said each of the plurality of sensing data received from the plurality of sensors is within the predetermined allowable range of the stored reference sensing data of said each of the plurality of sensors corresponding to the at least one operation state.

11. The method as claimed in claim 9, wherein the storing comprises, based on the first operation state of the at least one electronic apparatus being a new operation state, storing the plurality of sensing data received from said each of the plurality of sensors at a time point corresponding to the new operation state as a new reference sensing data corresponding to the new operation state.

12. The method as claimed in claim 9, wherein the storing comprises, based on the first operation state of the at least one electronic apparatus being a new operation state, storing the plurality of sensing data indicating a change in sensing value at a time point corresponding to the new operation state among the plurality of sensing data respectively received from the plurality of sensors as a new reference sensing data corresponding to the new operation state.

13. The method as claimed in claim 9, wherein the storing comprises, based on the first operation state of the at least one electronic apparatus being determined after a new sensor is registered in the home network, storing a new sensing data received from the new sensor at a time point corresponding to the determined first operation state as a new reference sensing data of the new sensor with respect to the determined first operation state.

14. The method as claimed in claim 9, wherein the predetermined ratio value is a ratio having a value less than 1.

* * * * *